United States Patent [19]

Tattrie

[11] Patent Number: 5,675,928
[45] Date of Patent: Oct. 14, 1997

[54] POWER SNARE

[76] Inventor: Donald Tattrie, Box 39, Eagle River, Ontario, Canada, P0V 1S0

[21] Appl. No.: 621,476

[22] Filed: Mar. 25, 1996

[51] Int. Cl.⁶ .................................................. A01M 23/34
[52] U.S. Cl. .................................................. 43/87; 43/15
[58] Field of Search .................................. 43/87, 85, 86, 43/15

[56] References Cited

U.S. PATENT DOCUMENTS

| | | | |
|---|---|---|---|
| 3,958,360 | 5/1976 | King | 43/87 |
| 4,069,612 | 1/1978 | King | 43/87 |
| 4,085,536 | 4/1978 | Wood, Jr. | 43/15 |
| 4,171,589 | 10/1979 | Brownlie | 43/87 |
| 4,193,220 | 3/1980 | Bourquin et al. | 43/15 |
| 4,290,222 | 9/1981 | McLeod | 43/15 |
| 4,581,843 | 4/1986 | Fremont et al. | 43/87 |
| 4,757,639 | 7/1988 | Bertram | 43/87 |
| 4,920,690 | 5/1990 | Olecko | 43/87 |
| 5,157,863 | 10/1992 | Godwin | 43/87 |

FOREIGN PATENT DOCUMENTS

| | | | |
|---|---|---|---|
| 1044892 | 12/1978 | Canada . | |
| 1117759 | 2/1982 | Canada . | |
| 1187697 | 5/1985 | Canada . | |
| 1263234 | 11/1989 | Canada . | |
| 1268943 | 5/1990 | Canada . | |
| 5535 | of 1908 | United Kingdom | 43/87 |
| 243872 | 12/1925 | United Kingdom | 43/87 |
| 364029 | 12/1931 | United Kingdom | 43/87 |

*Primary Examiner*—Jeanne Elpel
*Attorney, Agent, or Firm*—Murray E. Thrift; Adrian D. Battison

[57] ABSTRACT

A trap is of the power snare type for trapping fur-bearing animals, including large predators. The trap has a base arm and a snare arm as integral extensions of a torsion coil spring. The base arm is supported on the ground using a support assembly. A trigger connected to the support assembly engages the snare arm to hold it in a set position against the bias of the spring. The snare arm has an outer section that slopes upwardly across an animal trail so that the main part of this trap can be set to the side of the trail and a snare carried by the snare arm positioned across the trail. The free end of the snare is connected to the trigger so that the trap will be triggered by an animal engaging its head in the snare. Traps of this construction may also be used as tip-ups for fishing.

14 Claims, 2 Drawing Sheets

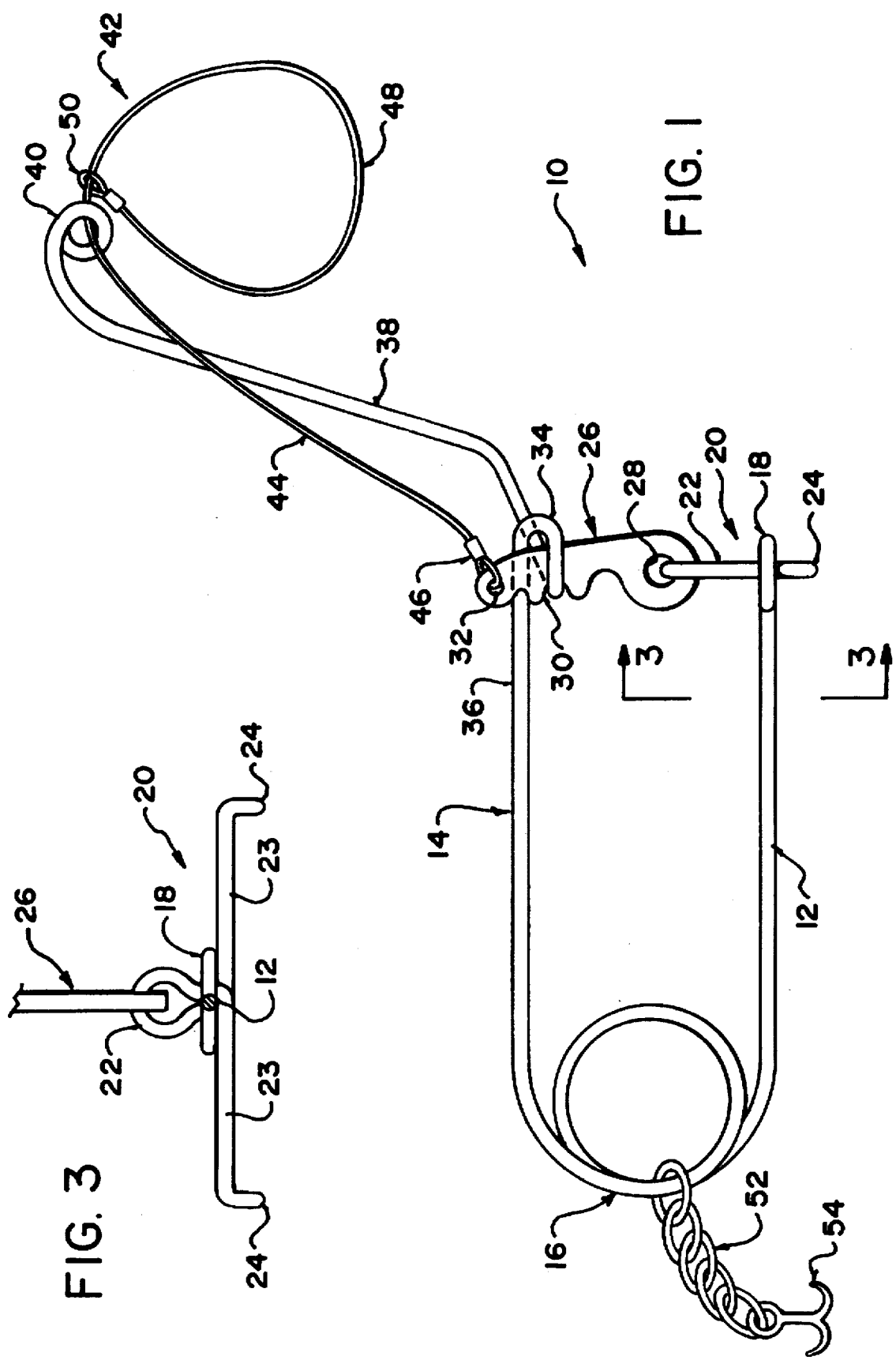

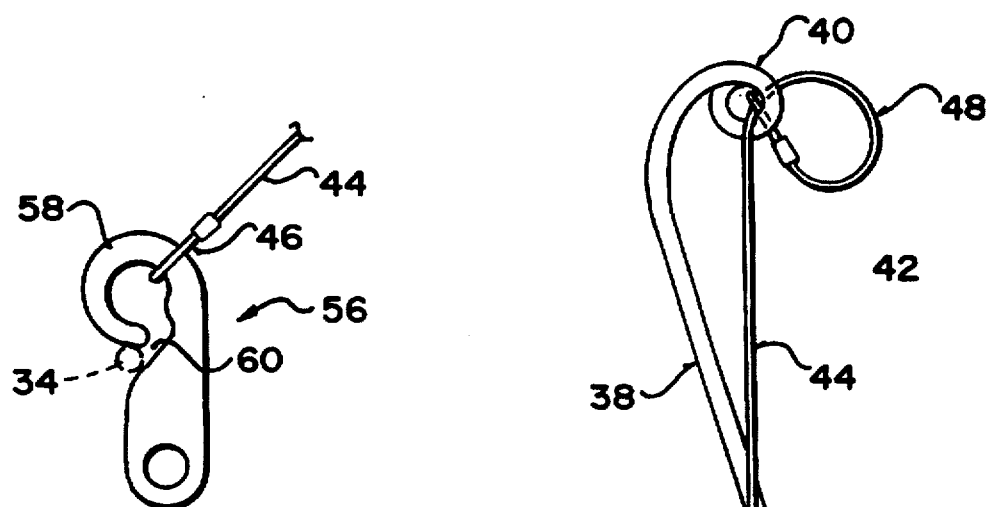
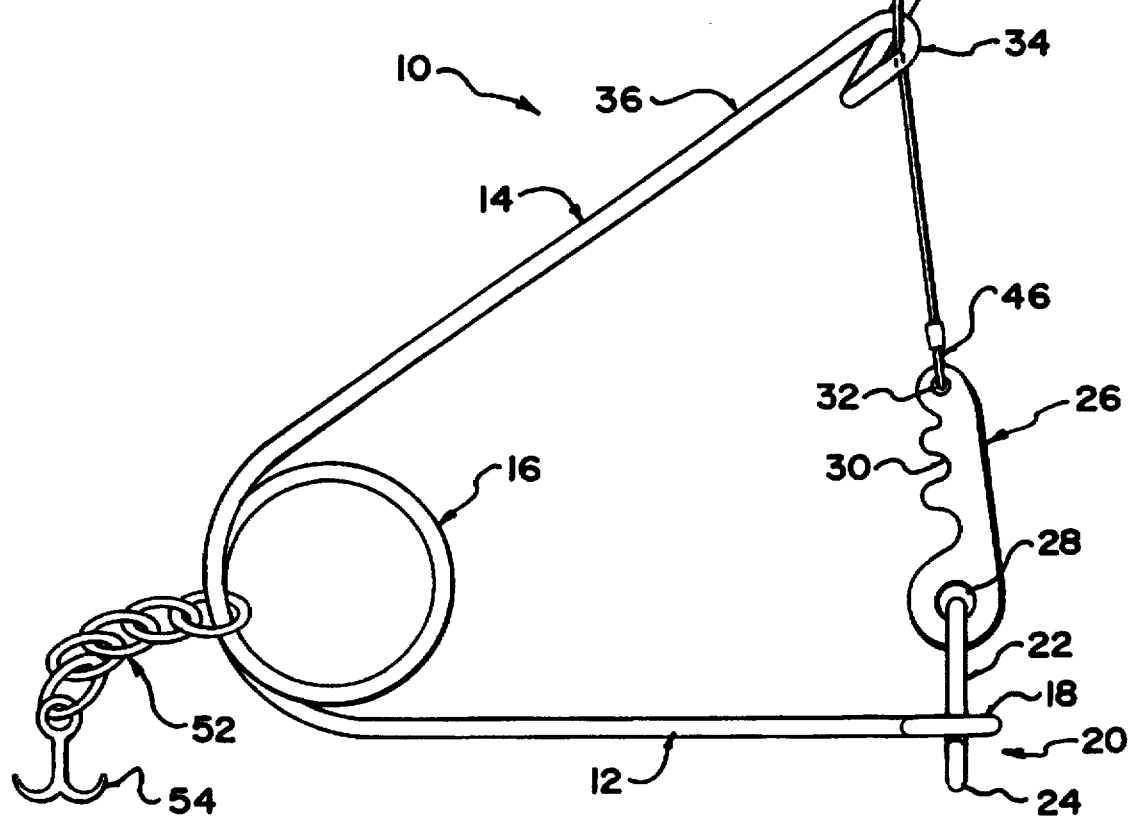

POWER SNARE

FIELD OF THE INVENTION

The present invention relates to animal traps and more particularly to power snares.

BACKGROUND

In recent years, considerable research has gone into the development of humane trapping methods. Much of this effort has been directed to the development of quick killing trapping systems for smaller fur-bearing animals. For larger animals, particularly the large predators, for example red fox, coyote, wolf and lynx, no consistently effective quick killing system has been designed, and research has been directed to the development of humane live trapping systems.

The present invention is concerned with a quick killing trap for the humane harvesting of all fur-bearing animals.

SUMMARY

According to the present invention there is provided a trap comprising:

a base arm with first and second ends;

a snare arm with first and second end portions;

resilient means connecting the first end of the base arm and the first end portion of the snare arm for movement of the snare arm between a set position with the first end portion of the snare arm lying adjacent the base arm and the second end portion projecting beyond the first end portion and the base arm to extend over an animal trail and a released position projecting a set position with the snare arm diverging from the base arm, the resilient means biasing the snare arm to the released position;

trigger means engageable between the base arm and the first end portion of the snare arm for releasably holding the snare arm in the set position;

snare tightening eye at the second end of the snare arm;

a snare with:

a first end connected to the trigger means for releasing the trigger means in response to tension on the snare, a standing part extending from the first end of the snare into through the snare tightening eye, and a second end formed into a snare loop;

support means for supporting the trap on a ground surface with the snare arm positioned above the base arm, said support means comprising a leg assembly including two divergent legs and swivel means connecting the legs to the second end of the base arm.

This is thus a mechanically powered, trigger activated trap that is free standing so that it can be used anywhere. The body of the trap is located near the ground and to one side of an animal trail, with the snare arm suspending the snare over the trail. The trap is easily hidden, and the snare arm has the appearance of a willow twig at an overhead level across the trail. This trap is easily and quickly set with minimal interference with the animal trail.

The trap is preferably made using a single spring steel rod as the base arm, a coil spring and the snare arm. The support for the base arm may be a steel rod support leg assembly that swivels on the free end of the base arm. The trigger may be a short arm carried by the support with a notch for engaging a loop in the snare arm.

Where desired, a grapple drag or tie-down may be used, connected to the coil spring.

Traps constructed in this way may be manufactured at low cost. Because of their relative simplicity and the robust nature of the design, little or no maintenance is required. The trap is light in weight and easy to carry. The traps have been found to provide a very quick kill time, even with large predators and it is impossible for an animal to pull out of the trap. The snare does not damage the animal's fur. The trap does not freeze up as can happen with more complex mechanical systems.

Traps constructed according to the present invention are easy to set and safe to handle. Eight or more of the traps can be set in the time that it normally takes to set a single leg hold or conibear trap.

BRIEF DESCRIPTION OF THE DRAWINGS

In the accompanying drawings, which illustrate exemplary embodiments of the present invention:

FIG. 1 is a side view of a trap according to the present invention in the set condition;

FIG. 2 is a side view of the trap in the released condition;

FIG. 3 is a cross-section along line 3—3 of FIG. 1; and

FIG. 4 is a side view of an alternative trigger.

DETAILED DESCRIPTION

Referring to the accompanying drawings, there is illustrated a trap 10 of the power snare type. The trap includes a base arm 12 and a snare arm 14 connected by a torsion coil spring 16. The two arms and the spring are a single length of spring steel rod. The spring biases the snare arm 14 to the release position illustrated in FIG. 2, with the snare arm projecting away from the spring end of the base arm. On the end of the base arm opposite the coil spring is an eye 18. This serves as a swivel coupling for a support 20. The support is a length of wire rod formed into a center eye 22 and two legs 23 projecting in opposite directions from the eye. A ground pin 24 is formed at the end of each leg. With the trap assembled, the eye 22 projects through the eye 18 of the base arm.

A trigger 26 is connected to the eye 22 of the support by engaging the eye 22 with a hole 28 in the bottom end of the trigger. Partway along the trigger is a notch 30 while at its upper end is an eye 32. The notch 30 of the trigger engages a loop 34 in the snare arm 14 located adjacent the outer end of an inner arm section 36. Beyond the loop, the outer section 38 of the snare arm slopes upwardly at an obtuse angle from the inner section 36. The outer snare arm section 38 terminates in a loop 40.

A snare 42 has a standing part 44 with an eye 46 at one end, engaging the eye 32 at the top of the trigger. The standing part extends through the loop 40 at the end of the snare arm and then forms a free-running loop 48, with an eye 50 on the end of the snare running freely on the standing part.

To impede the completely free movement of the trap, a chain 52 carrying a grapple type drag 54 is connected to the coil spring 16.

In use, the trap is set as shown in FIG. 1, with the snare arm outer section sloping upwardly across an animal trail and the main part of this trap set to the side of the trail. The snare is thus positioned across the trail. The snare arm is displaced against the bias of the coil spring 16 to the set position adjacent the base arm 12. The trigger notch 30 is then engaged with the loop 34 in the snare arm to retain the snare arm in this position. An animal traveling along the trail triggers the snare when its head passes through the snare loop 48 and puts some tension on the standing part 44 of the snare. The standing part acts as a trip line that pulls on and releases the trigger 26, allowing the snare arm 14 to spring away from the base arm, rapidly tensioning the loop 48 around the animal's neck and quickly killing the animal as desired.

The released position of the snare is illustrated in FIG. 2. As illustrated, the snare arm projects away from the spring end of the base arm, with the loop 40 displaced along the standing part of the snare to tighten the snare loop.

An alternative embodiment of the trigger is illustrated in FIG. 4. In this trigger 56, the notch 30 and eye 32 are replaced with a hook 58 at the upper end of the trigger. The throat 60 of the hook is sufficiently narrow that the snare arm loop 34 will not pass through the throat into the trigger hook. The throat will then act as a retaining notch. The hook 58 provides for easy snare replacement. The eye 46 of the snare need only be threaded through the loop 40 at the end of the snare arm and then hooked onto the trigger.

While certain embodiments of the invention have been described in the foregoing, it is to be understood that modifications can be made without departing from the invention. One such modification is the use of a tether or tie-down other than the grapple. The grapple is preferred, however, because it does not have to be attached to another object. In addition, a trap of this form can be used as a tip-up for fishing, with the tip-up automatically setting the hook when a fish takes the bait. The invention is therefore to be considered limited solely by the scope of the appended claims.

I claim:

1. A trap comprising:

a base arm with first and second ends;

a snare arm with first and second end portions;

resilient means connecting the first end of the base arm and the first end portion of the snare arm for movement of the snare arm between a set position with the first end portion of the snare arm lying adjacent the base arm and the second end portion projecting beyond the first end portion and the base arm to extend over an animal trail and a released position with the first end portion of the snare arm diverging from the base arm, the resilient means biasing the snare arm to the released position;

trigger means engageable between the base arm and the first end portion of the snare arm for releasably holding the snare arm in the set position;

snare tightening eye at the second end of the snare arm;

a snare with:

a first end connected to the trigger means for releasing the trigger means in response to tension on the snare, a standing part extending from the first end of the snare into through the snare tightening eye, and a second end formed into a snare loop;

support means for supporting the trap on a ground surface with the snare arm positioned above the base arm, said support means comprising a leg assembly including two divergent legs and swivel means connecting the legs to the second end of the base arm.

2. A trap according to claim 1 wherein the resilient means comprise a coil spring and the base arm and the snare arm comprise integral extensions of the spring.

3. A trap according to claim 1 wherein the swivel means comprise a base arm eye on the second end of the base arm and coupling means on the leg assembly extending upwardly through the base arm eye.

4. A trap according to claim 3 wherein the coupling means comprise an eye upstanding from the leg assembly.

5. A trap according to claim 3 including ground pins on the ends of the two legs.

6. A trap according to claim 4 wherein the trigger means comprises a trigger member connected to the leg assembly eye.

7. A trap according to claim 1 including a trigger loop in the snare arm, the trigger member extending through and engaging the trigger loop.

8. A trap according to claim 7 including a retainer notch in the trigger member for engaging the trigger loop to retain the snare arm in the set position.

9. A trap according to claim 1, including drag means for retarding free travel of the snare over the ground surface.

10. A trap according to claim 9 wherein the drag means are connected to the coil spring.

11. A trap according to claim 9 wherein the drag means comprise a grapple.

12. A trap comprising:

a base arm with first and second ends;

support means comprising a leg assembly including two divergent legs for supporting the base arm on a ground surface;

swivel means connecting the base arm to the support means; a coil spring connected to the first end of the base arm;

a second arm with first and second sections arranged at an obtuse angle to one another, the first section having a first end connected to the coil spring for movement of the second arm between a released position with the first section projecting away from the first end of the base arm and a set position with the first section adjacent the base arm, the spring biasing the second arm to the released position; and trigger means connected to the base arm and engagable with the first section of the second arm to releasably retain the snare arm in the set position.

13. A trap comprising:

a base arm with first and second ends;

support means for supporting the base arm on a ground surface;

swivel means connecting the base arm to the support means; a coil spring connected to the first end of the base arm;

a second arm with first and second sections arranged at an obtuse angle to one another, the first section having a first end connected to the coil spring for movement of the second arm between a released position with the first section projecting away from the first end of the base arm and a set position with the first section adjacent the base arm, the spring biasing the second arm to the released position, the second section of the second arm having a free end with an eye thereon;

trigger means connected to the base arm and engagable with the first section of the second arm to releasably retain the snare arm in the set position; and a trip line connected to the trigger means and extending through the eye for releasing the trigger means in response to tension on the trip line.

14. A trap according to claim 13 wherein the trip line comprises a snare.

* * * * *